Oct. 5, 1954     R. W. STELZEL     2,690,826
CENTRIFUGAL CLUTCH
Filed May 31, 1949
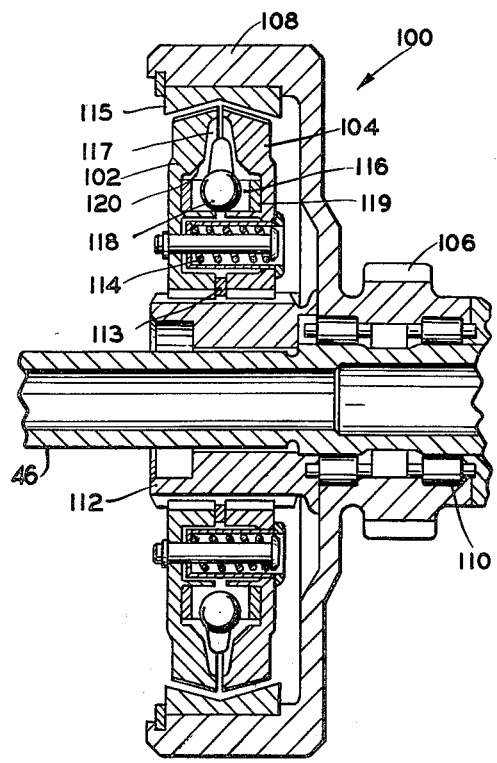
INVENTOR.
RODERICK W. STELZEL
BY
ATTORNEY Patented Oct. 5, 1954

2,690,826

UNITED STATES PATENT OFFICE 2,690,826

CENTRIFUGAL CLUTCH

Roderick W. Stelzel, Hohokus, N. J., assignor to Bendix Aviation Corporation, Teterboro, N. J., a corporation of Delaware Application May 31, 1949, Serial No. 96,257

4 Claims. (Cl. 192—105)

The present invention relates to centrifugal clutches and more particularly to a centrifugal clutch adapted for use in aircraft engine starters.

Present aircraft engines, such as jet engines, require sustained cranking at very high speeds. Due to these severe cranking requirements, the conventional electric starter is not practical and some means are necessary to obtain the high cranking speed required. One type of starter utilizes a small internal combustion engine connected through suitable reduction gearing to the engine to be started. One disadvantage of this type of starter is the low starting torque developed by such an engine. The present invention provides a novel centrifugal clutch adapted for use for such an engine to provide one ratio of gearing when starting and to automatically shift to a high ratio upon the cranking engine attaining a predetermined speed.

It is an object of the present invention to provide a novel centrifugal clutch.

Another object of the invention is to provide a novel centrifugal clutch adapted to engage at a higher speed than the disengaging speed.

Another object of the invention is to provide a novel centrifugal clutch for use with an internal combustion type starter.

The above and other objects and features of the invention will appear more fully hereinafter from a consideration of the following description taken in connection with the accompanying drawing wherein one embodiment of the invention is illustrated by way of example.

In the drawing:

The single figure is a sectional view of a centrifugal clutch illustrating one embodiment of the invention.

Referring now to the drawing, a centrifugal clutch 100 consists in general of a pair of adjacent driving clutch discs 102 and 104 and driven clutch member 108. The driving clutch discs 102 and 104 are splined to a ring member 112 and separated by a snap ring 113 secured in an annular groove in the ring member so as to permit restricted axial movement of the discs relative to the snap ring. The ring member 112 is rigidly mounted on shaft 46 or splined thereto. Each of the clutch discs 102 and 104 is shown as having a peripheral clutch surface in the form of a frustum of a cone with the side of the discs having the larger diameter facing each other. The discs are biased together by springs 114. Surrounding the clutch surfaces of the driving clutch discs is the driven clutch member 108 having mounted therein an annular friction member 115 having an integral V-shaped annular groove with the sides of the V parallel to and in spaced relation to the clutch surfaces of the clutch discs 102, 104 and arranged to make frictional engagement therewith when the discs are axially separated. Each of the facing sides of the discs is provided with an annular groove which when the discs are placed together form an annular enclosed channel 116 having a restricted wedge-formed radially extending portion 117. The channel has therein steel balls 118 kept in spaced relation by a floating cage or ball separator 119, the balls being of such size as to permit springs 114 to bring the discs together. The restricted portion 117 has an opening slightly smaller than the diameter of the balls and the channel converges into this extension by a ramp 120. The biasing spring 114, ramp 120 and the wedge-formed portion 117 are so proportioned that when the discs attain a predetermined speed, the balls 118, which up to this point have been resting against the ramps 120, will by the centrifugal force exerted thereon, ride up the ramp 120 and slip into the restricted extension 117 and thereby camming the discs apart and forcing the peripheral clutch surfaces of the discs into frictional engagement with the V-shaped clutch surfaces of the annular friction member 115. The sides of the wedge-formed extension 117 converge by a very small angle and as the speed of the driving discs increases, the balls, due to the centrifugal force exerted thereon will increase the pressure on the friction surfaces. When the speed is reduced substantially as when the starter is coming to rest, the balls will be returned to their initial position by the action of the springs 114 forcing the discs together and squeezing the balls out of the wedge-shaped extension into the channel proper. It should be noted that by this particular construction of the clutch the speed at which the clutch engages is much higher than the speed at which the clutch disengages, so that even if the increased load caused by the engagement of the lower reduction or high speed gearing causes the engine to slow down considerably, the reduced speed will not cause the clutch to disengage. For the sake of illustration, it may be mentioned that with the ramp 120 at an angle of 45° and the extension 117 at an angle of 8.5° the speeds at which the clutch engages and disengages varies by a factor of more than 3:1. The characteristics of the clutch may be modified to suit requirements by changing the angles of the ramp and the walls of the extension, the weight, size and number of balls and the tension of the springs 114. The particular form of the centrifugal type clutch just described gives it a snap action operation with no drag below the predetermined speed and with a positive gripping action between the clutch surfaces the moment the balls slip into the restricted portion of the pockets.

Although only one embodiment of the invention has been illustrated and described, various changes in the form and relative arrangements of the parts may be made to suit requirements.

What is claimed is:

1. In a variable speed drive speed responsive means for changing from one speed drive to another at a predetermined speed comprising a pair of adjacent axially movable annular driving clutch members mounted on a common drive, each having a peripheral clutch surface of gradually smaller diameter leading away from the adjoining sides; a driven clutch member surrounding said driving clutch members and having surfaces parallel to and in spaced relationship to said driving clutch surfaces, said driving clutch members defining an annular channel therein having an enlarged portion with substantially parallel radial sides, and a restricted portion radially outward from said enlarged portion having substantially radial sides converging with a relatively small angle outwardly, said enlarged and restricted portion being jointed by a ramp having a relatively large angle converging radially outward, resilient means biasing said driving clutch members together, a plurality of circumferentially spaced rolling members normally confined in said enlarged portion and of a size smaller than said enlarged portion and larger than said restricted portion and adapted to ride up the ramps, and slip into said restricted portion against said biasing means at a predetermined speed of said driving clutch members thereby forcing them axially apart to force the driving clutch surfaces into engagement with said driven clutch members, and to be forced out of said restricted portion into said enlarged portion by said biasing means to thereby disengage said clutch surfaces at a speed substantially lower than said predetermined speed.

2. A speed responsive clutch comprising a pair of annular driving clutch members each having a peripheral friction surface in the form of a frustum of a cone with the bases of the frustums facing each other and mounted for rotation on a driving member, one of said clutch members being axially movable with respect to said other clutch member and said driving member, means for biasing said members together, a plurality of clutch control members, said clutch members defining means therebetween for confining said clutch control members, said last mentioned means having a main portion and radially outwardly therefrom a restricted portion, a ramp having an angle converging radially outward greater than said restricted portion forming the connection between said portions, said clutch control members being of a size smaller than said main portion but larger than said restricted portion, a driven ring-like clutch member surrounding the peripheral surfaces of said driving clutch members and having an internal V-shaped friction surface with the sides of the V normally in substantially parallel spaced relationship with said peripheral friction surfaces of said driving clutch members.

3. A speed responsive clutch device comprising driving and driven clutch members, said driving clutch member comprising a pair of separable annular members each having a peripheral edge in the shape of a frustum of a cone with the base of the frustums facing each other, biasing means urging said annular members together, clutch control members, means for confining said control members loosely between said separable driving clutch members, said confining means having an outwardly radially extending restricted portion smaller than said control members and connected to said confining means by a ramp forming an obtuse angle with said restricted portion, said driving clutch member being ring-shaped and having internally thereof a friction member having a V-shaped groove, said driving clutch member and driven clutch member being so related that the peripheral edges of said annular members are substantially parallel with and normally spaced from the sides of the V of the groove so as to make frictional engagement therewith where said driving member attains a predetermined speed and said clutch control members ride up said ramp and enter said restricted portion by centrifugal force thereby camming said annular members apart.

4. A speed responsive clutch device comprising driving and driven clutch members, said driving clutch member comprising a pair of separable annular members each having a peripheral edge in the shape of a frustum of a cone with the base of the frustums facing each other, biasing means urging said annular members together, clutch control members, means for confining said control members loosely between said separable driving clutch members, said confining means having substantially parallel radial walls and having an outwardly radially extending restricted portion with sides converging radially outwardly with an entrance smaller than said control members and being connected to said confining means by a ramp converging radially outward at an angle substantially greater than said restricted portion, said driven clutch member being ring-shaped and having internally thereof a friction member having a V-shped groove, said driving clutch member and driven clutch member being so related that the peripheral edges of said annular members are substantially parallel with and normally spaced from the sides of the V of the groove so as to make frictional engagement therewith when said driving member attains a predetermined speed and said clutch control members ride up said ramp and enter said restricted portion by centrifugal force thereby camming said annular members apart.

References Cited in the file of this patent

UNITED STATES PATENTS

| Number | Name | Date |
|---|---|---|
| 1,849,177 | Dickson | Mar. 15, 1932 |
| 1,947,632 | Woodruff | Feb. 20, 1934 |
| 1,948,034 | Welch | Feb. 20, 1934 |
| 2,018,101 | Swennes | Oct. 22, 1935 |
| 2,081,743 | Glen | May 25, 1937 |
| 2,172,991 | Segard | Sept. 12, 1939 |
| 2,306,696 | Hale | Dec. 29, 1942 |
| 2,388,469 | DaCosta | Nov. 6, 1945 |
| 2,496,201 | Dodge | Jan. 31, 1950 |

FOREIGN PATENTS

| Number | Country | Date |
|---|---|---|
| 283,380 | Great Britain | Jan. 12, 1928 |
| 394,467 | Great Britain | June 29, 1933 |
| 650,073 | France | Sept. 11, 1928 |